United States Patent [19]
Lyle

[11] Patent Number: 5,482,384
[45] Date of Patent: Jan. 9, 1996

[54] ANTI-WALLOWING ROTOR MOUNTING SYSTEM

[75] Inventor: David M. Lyle, McMinnville, Tenn.

[73] Assignee: MagneTek, Inc., Nashville, Tenn.

[21] Appl. No.: 423,778

[22] Filed: Apr. 18, 1995

[51] Int. Cl.⁶ ............................................. F16C 35/06
[52] U.S. Cl. ..................... 384/537; 384/493; 384/906
[58] Field of Search ............................ 384/493, 513, 384/517, 557, 569, 584, 585, 906, 537, 538, 539, 498

[56] References Cited

U.S. PATENT DOCUMENTS

| | | | |
|---|---|---|---|
| H000,242 | 4/1987 | Eng | 384/537 X |
| 1,255,378 | 2/1918 | Beach | 384/537 |
| 2,239,154 | 4/1941 | Keane | 384/537 |
| 2,682,435 | 6/1954 | Rien et al. | 384/569 X |
| 2,837,382 | 6/1958 | Schaefer | 384/539 |
| 2,877,068 | 3/1959 | Schaefer | 384/537 |
| 3,655,252 | 4/1972 | Crecelius | 384/537 |
| 4,729,674 | 3/1988 | Siebert et al. | 384/906 X |

*Primary Examiner*—Thomas R. Hannon
*Attorney, Agent, or Firm*—Seldon & Scillieri

[57] ABSTRACT

In a rotor mounting system, a tab is welded to the outer race of a bearing assembly extending in a radial direction beyond the diameter of the outer race. The motor bracket housing includes a boss projecting upward from the housing proximate to the receiving cavity for the bearing assembly, such that when the bearing assembly is seated in the receiving cavity, interference between the tab and the boss prevents rotation of the outer race within the receiving cavity.

4 Claims, 1 Drawing Sheet

ANTI-WALLOWING ROTOR MOUNTING SYSTEM

BACKGROUND OF THE INVENTION

1. Technical Field

The present invention relates generally to the field of motors, and in particular to bearings used to mount a rotor shaft to a motor housing.

2. Background Art

One failure mode of prior art rotor bearing assemblies is known as "wallowing," which occurs when the outer ball bearing race of the lead end bearing assembly creeps and spins radially within the bearing cavity in the bracket housing. In one prior art assembly, the bearing and housing are equipped with additional mounting hardware to prevent creepage of the inner and outer races. First, a ball is welded to both the outer and inner races prior to installation, both on the same face of the bearing. The bearing is then assembled in the bracket cavity, without the rotor. The face of the bearing is recessed below the surface of the mouth of the bearing cavity; the balls protrude above the mouth. A tab is then installed, via a self-tapping screw, to the bracket housing adjacent to the mouth of the bearing cavity such that the tab overhangs the outer race. The interference between the tab and the ball on the outer race eliminates outer race rotation. Next, an upset, or burr, is generated on the rotor shaft bearing shoulder/seat. At final motor assembly, the bearing bracket assembly is slip-fitted onto the bearing journal. The upset generated on the shaft bearing shoulder provides a stop for the ball welded to the inner race, prohibiting inner race rotation.

This prior art bearing assembly is disadvantageous because the bearing assembly must be seated in its receiving cavity before the tab affixed to the bracket housing can be attached and before the bearing bracket assembly is slip-fitted onto the bearing journal. These steps require additional time and labor, resulting in increased manufacturing costs.

There is thus a need for a rotor assembly in which the problem of wallowing is addressed without requiring the mounting of additional hardware after the bearing assembly is seated in its receiving cavity.

SUMMARY OF THE INVENTION

The present invention provides a rotor mounting system in which wallowing is prevented without requiring the mounting of additional hardware after the bearing assembly is seated in its receiving cavity. In a preferred embodiment of the present invention, a tab is welded to the outer race of the bearing assembly extending in a radial direction beyond the diameter of the outer race, such that when the outer race rotates within the bearing cavity, the tab defines a circular path. In this embodiment, the housing includes a circular boss projecting upward from the housing in the circular path defined by the movement of the tab. When the rotation of the outer race causes the tab to abut the boss, further rotation of the outer race is prevented.

DESCRIPTION OF SPECIFIC EMBODIMENTS

The lead end of a rotor shaft, i.e., the end opposite the drive end, is mounted to a motor housing by means of a bearing assembly that includes an inner race fitting around the rotor shaft and an outer race that fits inside a receiving cavity, or bore, in the motor housing. The inner and outer races are grooved to receive ball bearings between them.

In certain motors, it is desirable for the drive end of the rotor shaft to be locked in the axial direction with respect to the rotor housing, while the opposite, or "lead" end is not locked, thereby allowing a certain amount of movement in the axial direction. The locking of the shaft at the drive end holds the shaft dimension, as the shaft is subject to various radial and axial loads. Further, as in the case of a pump motor, the locking of the drive end also serves to maintain the impeller distance from the pump housing for optimum pump performance.

Allowing axial movement at the lead end provides for thermal expansion. Locking the rotor shaft at both ends could result in brinelling of the motor assembly. The lead end bearing may include a load spring in the bottom of the bore that exerts a preload to the bearing that eliminates motor noise.

One problem that has plagued motors with floating lead ends is the "wallowing" or "beating" out of the bearing assembly from the motor lead end bearing bore. Wallowing occurs when the outer ball bearing race creeps and spins radially within the lead end bracket housing. This failure mode occurs once the bearing area experiences an increase in temperature due to both motor winding and bearing losses. Since the coefficient of thermal expansion is greater in the aluminum bracket housing relative to the bearing outer-race, a clearance or gap is created during this temperature increase, causing the outer-race creepage within the bore.

Figure 1:
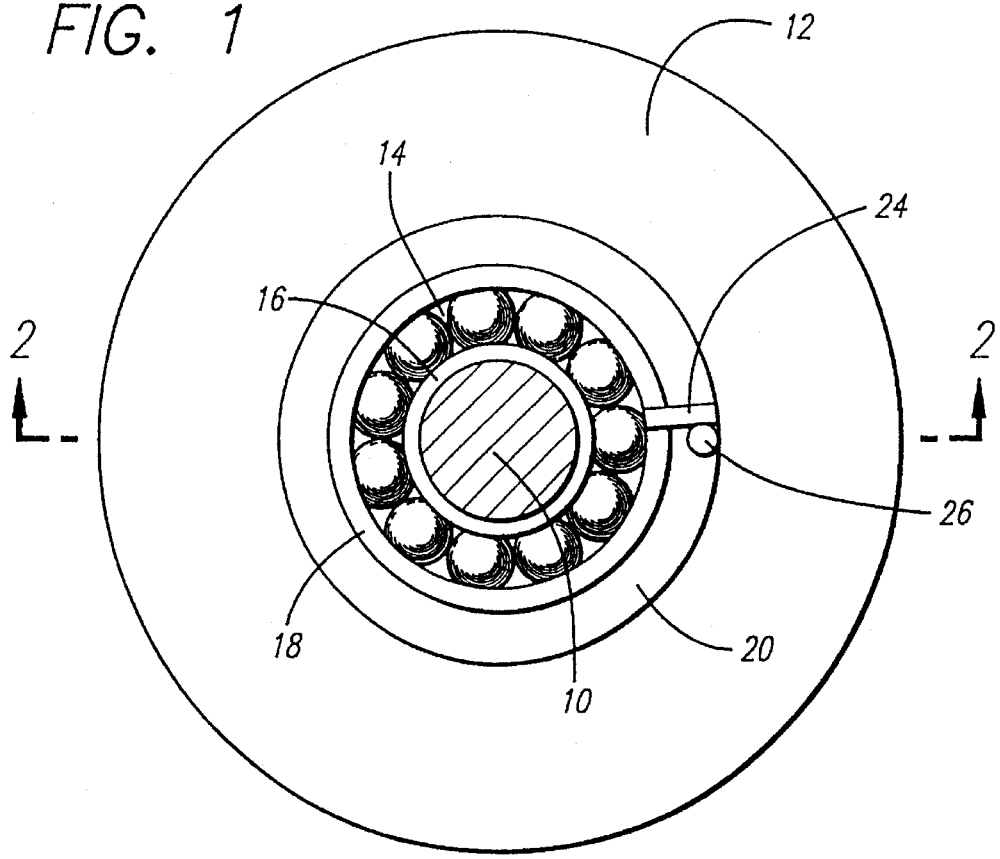
FIG. 1 shows a top view of the lead end of a rotor shaft, bearing assembly, and motor housing according to a preferred embodiment of the present invention.
Figure 2:
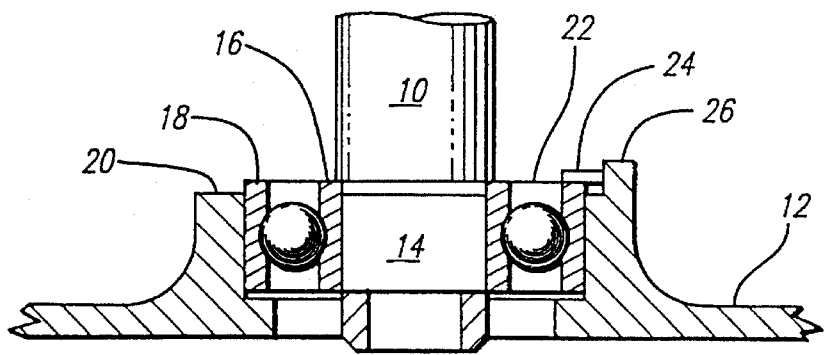
FIG. 2 shows a cross section of the rotor shaft, bearing assembly, and motor housing shown in FIG. 1 taken through the plane 2—2.

FIGS. 1 and 2 show, respectively, a top view and a cross section of the lead end of a rotor shaft 10, a motor housing 12, and a bearing assembly 14 according to a preferred embodiment of the present invention. As shown in FIG. 2, the bearing assembly includes an inner race 16 encircling the rotor shaft, and an outer race 18 fitting into a receiving cavity, or bore, in the housing 12. The inner and outer races are each grooved to receive ball bearings. The bearing assembly is not locked with respect to the housing,: the standard axial movement of the shaft and bearing in FIGS. 1 and 2 is ±0.0125 in.

As is apparent from FIGS. 1 and 2, the bearing assembly 14 is a flat cylinder that fits closely inside its receiving cavity. In a preferred embodiment of the present invention, the bearing cavity is defined by a powdered steel insert, which is inserted into the housing during the casting process and becomes an integral part of the housing. After casting, the insert is machined to provide for a proper fit of the bearing assembly into the bearing cavity.

As shown in FIGS. 1 and 2, the mouth of the bearing bore defines a planar, circular surface 20. When the bearing assembly 14 is seated in its receiving cavity, the upper surface 22 of the bearing assembly 14 is exposed. In accordance with the present invention, it is preferable for the upper surface of the bearing assembly to protrude slightly above the mouth of the bearing cavity, in order to allow some clearance between tab 24 and the surface of the housing 20 proximate to the bearing cavity.

In order to prevent wallowing, the present invention provides a tab 24 that is welded to the upper surface of the outer race extending beyond the bearing diameter in a radial direction, above the mouth of the bearing cavity. Thus, should the outer race begin to rotate within the bearing cavity, tab 24 will rotate over the mouth of the bearing cavity.

As shown in FIGS. 1 and 2, the housing 12 is provided with a circular boss 26 proximate to the bearing cavity that projects upward into the circular path defined by tab 24. Boss 26 is preferably cast directly onto the housing. It will be seen that should outer race 18 rotate within its receiving cavity, it will rotate only until tab 24 abuts the boss 26, thereby preventing any further rotation of the outer race relative to the motor housing.

Tab 24 is welded to outer race 18 and boss 26 is cast onto housing 12 prior to the assembly of the motor. The motor is assembled by pressing the bearing assembly 14 onto the rotor shaft 10, and then inserting the shaft/bearing assembly into the housing 12, seating the bearing 14 into its receiving cavity while making sure that tab 24 is clear of boss 26. Unlike the prior art, no additional anti-rotation hardware is installed after the bearing 14 is seated in its receiving cavity.

It is important to note that during assembly, tab 24 need not be lined up so that it abuts boss 26. Rather, the tab may be initially situated anywhere along the mouth of the receiving cavity so long as it does not collide with boss 26. During motor operation, should wallowing occur, outer race 18 will begin to creep around radially until tab 24 abuts boss 26. Thus, the bearing assembly is easy to assemble, as no parts need to be aligned. All that is required is for tab 24 to be clear of boss 26. It will be appreciated from FIGS. 1 and 2 that tab 24 and boss 26 each occupy less than 10 degrees of the circumference of the outer race and the mouth of the receiving cavity. Thus, in effect, there is a 350-degree margin of error in assembling the motor.

In an alternative preferred embodiment of the present invention, a wire in used in place of tab 24. Similar to tab 24, the wire is welded so that it extends beyond the diameter of the bearing assembly in a radial direction above the mouth of the bearing bore. In all other respects, this alternative embodiment is identical to the preferred embodiment described above.

While the foregoing description includes detail which will enable those skilled in the art to practice the invention, it should be recognized that the description is illustrative in nature and that many modifications and variations will be apparent to those skilled in the art having the benefit of these teachings. It is accordingly intended that the invention herein be defined solely by the claims appended hereto and that the claims be interpreted as broadly as permitted in light of the prior art.

What is claimed is:

1. A rotor mounting system, comprising:
   a cylindrical bearing assembly with upper and lower surfaces, the bearing assembly including concentric inner and outer races defining between them a pathway for ball bearings, the inner race fitting around one end of a rotor shaft;
   a housing including a cavity shaped to receive the outer race of the bearing assembly, such that when the outer race is seated within the cavity, the upper surface of the bearing assembly is exposed above the cavity;
   a first member mounted to the outer race of the bearing assembly extending in a radial direction beyond the diameter of the outer race, such that when the bearing assembly is seated in the cavity, the first member overhangs the housing proximate to the cavity, and such that when the outer race rotates within the cavity, the first member defines a circular path over the housing proximate to the cavity;
   a second member projecting upward from the housing proximate to the cavity, the second member lying in the circular path defined by the rotation of the first member, such that when the rotation of the outer race causes the first member to abut the second member, further rotation of the outer race is prevented.

2. A rotor mounting system according to claim 1, wherein the first member comprises a tab welded onto the outer race.

3. A rotor mounting system according to claim 1, wherein the first member comprises a wire welded onto the outer race.

4. A rotor mounting system according to claim 1, wherein the second member comprises a boss cast into the housing.

* * * * *